United States Patent
Velez et al.

(10) Patent No.: US 6,938,437 B2
(45) Date of Patent: Sep. 6, 2005

(54) CYLINDRICAL SEAL FOR REFRIGERANT TUBE CONNECTOR

(75) Inventors: Hector Velez, Miami, FL (US); David Neranjan, Miramar, FL (US)

(73) Assignee: A-1 Components Corporation, Hialeah, FL (US)

( * ) Notice: Subject to any disclaimer, the term of this patent is extended or adjusted under 35 U.S.C. 154(b) by 0 days.

(21) Appl. No.: 10/463,869

(22) Filed: Jun. 17, 2003

(65) Prior Publication Data

US 2004/0255608 A1 Dec. 23, 2004

(Under 37 CFR 1.47)

(51) Int. Cl.$^7$ .......................... F25B 43/00; F16L 43/00; B01D 35/00; B01D 24/00
(52) U.S. Cl. .................. 62/474; 137/140; 137/237; 137/544; 210/91; 210/232; 210/282
(58) Field of Search ............................ 62/474; 137/140, 137/237, 544, 232; 210/91, 232, 282; 285/39, 38, 93, 308, 321, 422, 921

(56) References Cited

U.S. PATENT DOCUMENTS

| | | | | | |
|---|---|---|---|---|---|
| 4,442,003 A | * | 4/1984 | Holt | ........................... | 210/445 |
| 5,016,920 A | * | 5/1991 | Anderson | ..................... | 285/39 |
| 5,425,558 A | * | 6/1995 | Dennany, Jr. | ............... | 285/308 |
| 5,553,895 A | | 9/1996 | Karl | | |
| 5,685,575 A | * | 11/1997 | Allread et al. | ................ | 285/39 |
| 5,831,149 A | * | 11/1998 | Webb | ...................... | 73/40.5 R |

* cited by examiner

*Primary Examiner*—Cheryl Tyler
*Assistant Examiner*—Filip Zec
(74) *Attorney, Agent, or Firm*—Carlson, Gaskey & Olds

(57) ABSTRACT

A refrigerant connection includes a ferrule positioned within a threaded nut. The threaded nut is received on a connector body. A seal is positioned between the ferrule and the connector body. As the nut is turned on the connector body, the ferrule squeezes the seal. The seal is cylindrical such that sealing surfaces are provided at each axial end and at an outer periphery. In this way, the seal is not as sensitive to surface imperfections in the various components as was the case in the prior art.

7 Claims, 2 Drawing Sheets

CYLINDRICAL SEAL FOR REFRIGERANT TUBE CONNECTOR

BACKGROUND OF THE INVENTION

The present invention relates to the use of a cylindrical shaped seal in a refrigerant line connector, preferably for an air conditioning system in a vehicle.

In the prior art, refrigerant lines communicate a refrigerant between the various components in a refrigerant cycle. There are several connectors that connect the lines to various components. A fluid tight seal must be provided at each of these connections. In one particular type connector, a threaded nut is threadably connected to a second connector member. In this way, a refrigerant tube may be connected to another component.

In the past, an O-ring seal has been provided between the nut and the housing. The O-ring seal is intended to provide the fluid tight seal mentioned above. In one particular application, a fluid tube is connected to a ferrule. The ferrule is inserted into the second connector member. The nut is then tightened onto the second connector member to squeeze the ferrule against the second connector member. The seal must seal at its outer periphery with the second connector member, and at its inner periphery with the refrigerant tube. Both of these sealing areas must be fluid tight.

However, due to the small sealing area of an O-ring seal, it is sometimes difficult to provide the fluid tight seal with an O-ring. In particular, an O-ring seal does require good surface conditions, without surface imperfections, flaws, etc. In many applications, and in particular in vehicle applications, the fluid connector components may have surface imperfections. Thus, O-ring seals have not always been fully acceptable for these applications.

SUMMARY OF THE INVENTION

In a disclosed embodiment of this invention, the refrigerant fluid connector is provided with a cylindrically shaped seal. The cylindrically shaped seal extends along a length that is on the order of at least twice the radial thickness of the seal. In this way, and as the seal is compressed between the components, there is a good deal of sealing surface area between the seal and the fluid components. This assures that the seal can accommodate surface imperfections, etc.

In addition, the cylindrical seal has two flat end surfaces that provide additional sealing contact. Thus, there is sealing at the peripheries of the seal and at the two end surfaces. Thus, an adequate seal is provided.

These and other features of the present invention can be best understood from the following specification and drawings, the following of which is a brief description.

DETAILED DESCRIPTION OF THE PREFERRED EMBODIMENT

Figure 1:
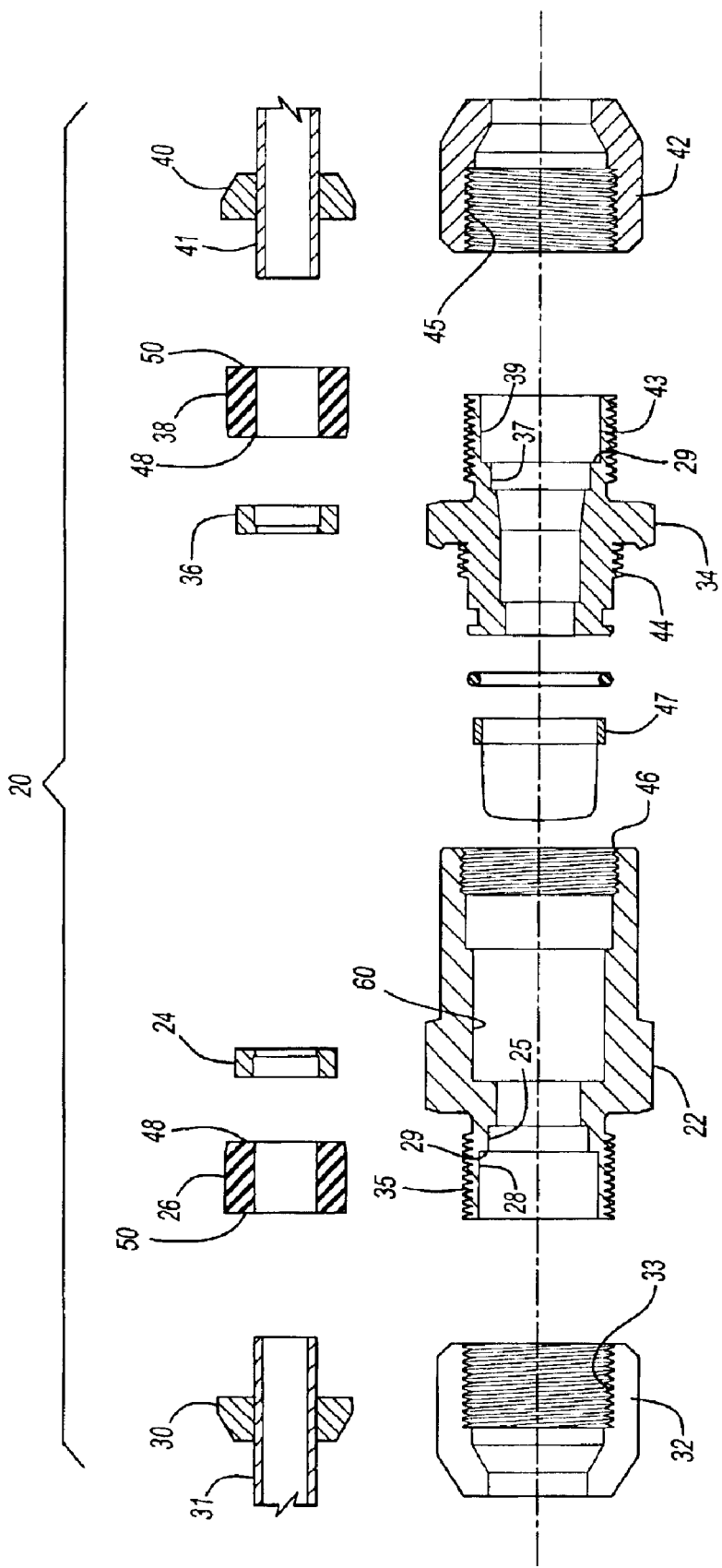
FIG. 1 is an exploded view of a complex refrigerator connector system.

FIG. 1 shows a fluid connector 20 for incorporating a filter between two refrigerant fluid tubes. As shown, a filter body 22 receives a bushing 24 in an inner bore 25. A cylindrical seal 26 is received within a bore 28. A radially inwardly extending end wall 29 extends from bore 28 to bore 25. A ferrule 30 is positioned outwardly of the seal 28. A refrigerant tube 31 is fixed to ferrule 30. A nut 32 is threaded onto the outer periphery of the filter body 22, forcing the ferrule 30 against the seal 26 to provide a fluid tight seal. Notably, the seal 26 has two flat end surfaces 48 and 50, that abut end wall 29 and ferrule 30, respectively. A second end cap 34 receives a bushing 36 in its bore 37, and a seal 38 in bore 39. A ferrule 40 again is sandwiched by a nut 42 to squeeze the seal 38. Again, a refrigerant tube 41 is fixed to ferrule 40. Here also is an end wall and two flat end surfaces 48 and 50 on seal 38. As shown, threads 44 and 46 connect the filter body 22 and the end cap 44. A filter 47 is captured in chamber 60.

Figure 2:
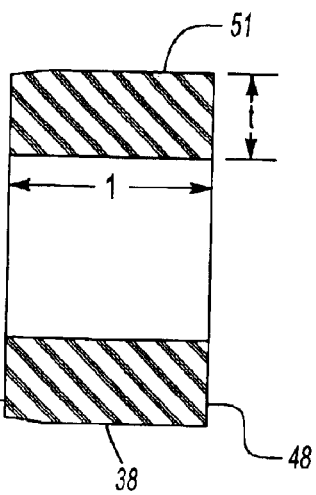
FIG. 2 is a cross-sectional view of the inventive seal.

As shown in FIG. 2, the seal 38 (or 26) is generally cylindrical and extends along a length l and for a radial thickness t. As is clear from this figure, the length l is at least twice the thickness t. In one embodiment, where the seal has an inner peripheral bore of 5/16", the ratio is 1:2.78. Further, the outer peripheral surface 51 of the seal 38 is not purely cylindrical, but rather has a curve which will better accommodate the inner periphery of the inner peripheral bores 28 or 39. Flat end surfaces 48 and 50 are also formed on the seal.

Figure 3:
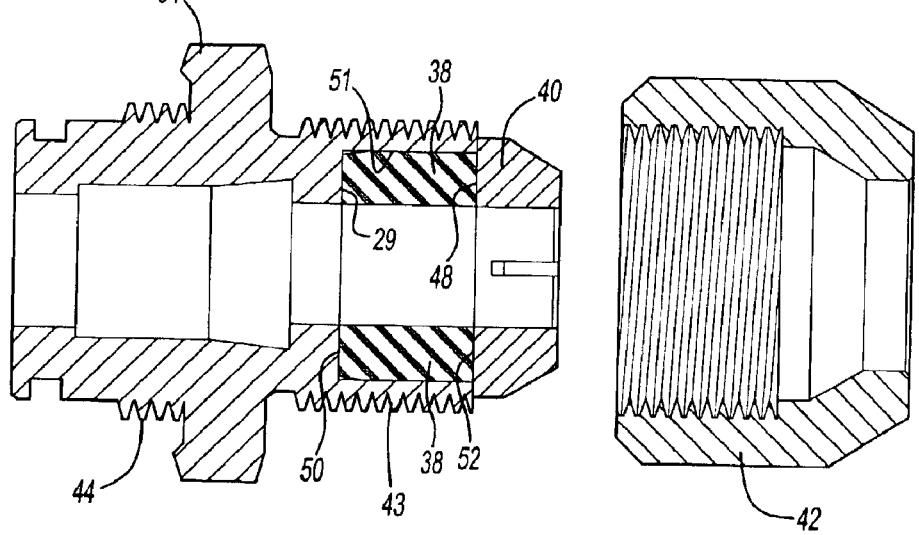
FIG. 3 is a partially assembled view of a single refrigerant fluid connector incorporating the inventive seal.
Figure 4:
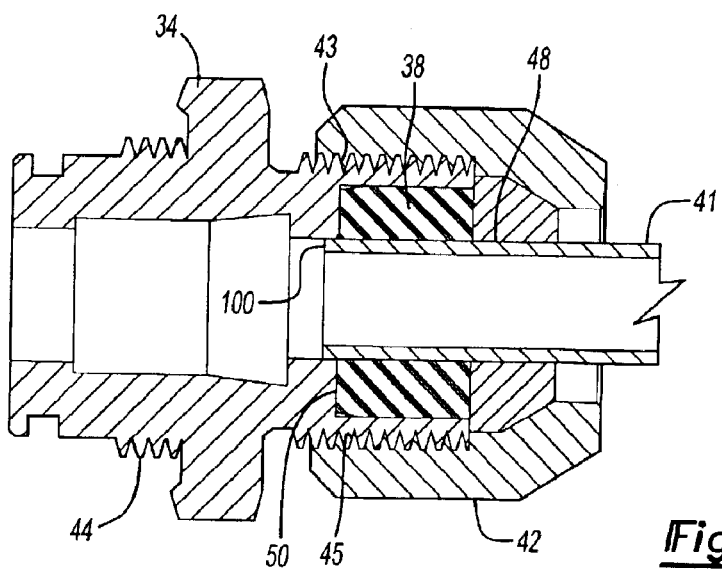
FIG. 4 is an assembled view.

FIGS. 3 and 4 show a somewhat distinct application wherein the bushings 36 and 24 are eliminated along with the respective bores 37 and 25. While the connection is shown within a housing 34, what is shown as the filter end cap from FIG. 1, it should be appreciated that the applications shown in FIGS. 3 and 4 show that the present invention and its cylindrical seal do extend to other refrigerant line applications.

Ferrule 40 has an end surface 52 abutting end surface 48. Further, the end surface 50 abuts an end wall 29 of the end adapter 44. When the nut 42 is tightened onto the threads of the adapter 44, the ferrule 40 is squeezed against the seal 38 such that sealing surfaces are provided at both end surfaces 48 and 50, and further at the outer peripheral surface 51. In this way, a fluid tight seal is provided. Even if there are surface imperfections within the surfaces in the adapter 44, this seal will accommodate any such imperfections.

As shown in FIG. 4, a refrigerant tube 41 extends into the bore of the housing member 34 such that an inner end 100 of the tube is preferably axially beyond the axially innermost end 50 of the seal 38. Thus, there is sealing contact between the seal 38 at both ends, and at both its inner and outer periphery. This combined seal provides a much greater sealing surface area than was the case with the prior art O-ring.

Thus, the present invention provides a seal that is better equipped to deal with imperfections in the manufactured parts. While a preferred type of refrigerant connector is illustrated, the present invention could be utilized in many other refrigerant lines. Most preferably, the present invention is used on a refrigerant line in a vehicle application.

The seal is preferably formed of HNBR, although other materials can be utilized.

Although a preferred embodiment of this invention has been disclosed, a worker of ordinary skill in this art would recognize that certain modifications would come within the scope of this invention. For that reason, the following claims should be studied to determine the true scope and content of this invention.

What is claimed is:

1. A refrigerant connector for receiving a filter comprising:

a filter body including a chamber for receiving a filter, said filter body having a threaded outer peripheral surface at one end remote from said filter chamber, said one end of said filter body including an inner peripheral bore;

a filter received in said filter chamber;

a filter end cap threadably received on said filter body to capture said filter within said filter chamber, said filter end cap having a threaded outer peripheral surface at an opposed end of said filter end cap removed from said filter, and said filter end cap having an inner peripheral bore;

ferrules positioned adjacent said opposed end of said filter end cap, and adjacent said one end of said filter body, and nuts capturing said ferrules and forcing said ferrules against said end cap and said filter body, respectively, said nuts being threadably received on said threads on said outer peripheral surface of said filter body and said filter end cap, respectively; and a seal having a generally cylindrical outer peripheral surface and extending between two opposed generally flat axial ends, said seal received between said ferrule and said filter end cap, and a seal having a generally cylindrical outer peripheral surface and extending between two opposed generally flat axial ends, said seal received between said ferrule and said filter body, said nuts forcing said ferrules against said seals to compress said seals between said ferrule and said filter body, and between said ferrule and said filter end cap.

2. A refrigerant connector as recited in claim 1, wherein said ferrules abutting one of said flat axial ends, and a second of said flat axial ends being forced against an inner surface of said filter body and said filter end cap.

3. A refrigerant connector as recited in claim 2, wherein said filter body and said filter end cap each having an inner peripheral surface and an end wall extending radially inwardly from said inner peripheral bore, said second axial end of said seals abutting said end walls, and said cylindrical outer peripheral surface of said seals abutting said inner peripheral bores.

4. A refrigerant connector as recited in claim 3, wherein a refrigerant tube extends through an inner peripheral bore of each said ferrule, said refrigerant tubes extending axially inwardly into said inner bores axially beyond an axially innermost surface of said seals, and said seals being in sealing contact with an outer peripheral surface of said tubes.

5. A refrigerant connector as recited in claim 1, wherein said seals have a length extending along a central axis which is more than twice a radial thickness of said seals.

6. The refrigerant connector as recited in claim 1, wherein each said ferrule has an end face abutting both an end face of a respective one of said filter body and said filter end cap, and one of said flat axial ends of a respective one of said seal, such that said ferrules compress said seals as said ferrule end face is brought against said end face of said filter body and said filter end cap respectively.

7. The refrigerant connector as recited in claim 6, wherein each said seal is entirely received in said inner peripheral bore.

* * * * *